(12) United States Patent
Desai et al.

(10) Patent No.: US 7,895,435 B2
(45) Date of Patent: Feb. 22, 2011

(54) FRAMEWORK FOR MANAGING ATTRIBUTES OF OBJECTS

(75) Inventors: Saurabh Desai, Austin, TX (US);
Niteesh Kumar Dubey, Yorktown Heights, NY (US); Joefon Jann, Ossining, NY (US); Pratap Chandra Pattnaik, Ossining, NY (US); Ravi A. Shankar, Austin, TX (US); Murali Vaddagiri, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 11/751,571

(22) Filed: May 21, 2007

(65) Prior Publication Data

US 2008/0294592 A1 Nov. 27, 2008

(51) Int. Cl.
*H04L 29/06* (2006.01)
(52) U.S. Cl. .......................... 713/167; 713/166; 707/1
(58) Field of Classification Search ................ 713/167, 713/166; 707/1
See application file for complete search history.

(56) References Cited

U.S. PATENT DOCUMENTS 4,525,780 A * 6/1985 Bratt et al. .................. 711/163

2003/0145235 A1* 7/2003 Choo .......................... 713/201
2003/0149895 A1* 8/2003 Choo et al. .................. 713/201
2003/0172109 A1* 9/2003 Dalton et al. ................ 709/203

OTHER PUBLICATIONS

Sobell, "A Practical Guide to Red Hat Linux—Chapter: The Linux Filesystem—ACLs: Access Control Lists", Jun. 27, 2006, Prentice Hall, retrieved Jun. 27, 2008, http://proquest.safaribooksonline.com/0132280272/ch06lev1sec7>.

* cited by examiner

Primary Examiner—Kambiz Zand
Assistant Examiner—Amare Tabor
(74) Attorney, Agent, or Firm—Yee & Associates, P.cC.; Matthew W. Baca (57) ABSTRACT

A computer implemented method, computer program product, and system for managing objects. Responsive to receiving a find-rule method, and a path-rule table, wherein the path-rule table contains a set of paths, wherein each path references an object, wherein a file system locates the object using the path, and wherein the object has at least one attribute not known to the file system, a path-rule table identifier is created. The path-rule table is associated with the path-rule table identifier to form an associated path-rule table. The find-rule method is associated with the path-rule table identifier to form an associated find-rule method. The path-rule table identifier, the associated path-rule table, and the associated find-rule method are stored. The path-rule table identifier is returned.

14 Claims, 6 Drawing Sheets

| Absolute Path | Access Rule |
|---|---|
| /usr/sbin/mount | accessauths=aix.fs.manage.mount<br>innateprivs=PV_DAC_W,PV_FS_MOUNT,PV_SU_UID<br>secflags=FSF_EPS |
| /usr/bin/chrole | accessauths=aix.security.role.change<br>innateprivs=PV_AU_ADD,PV_AU_PROC,PV_SU_UID<br>secflags=FSF_EPS |
| /usr/bin/chown | accessauths=aix.fs.object.owner<br>innateprivs=PV_DAC_X,PV_DAC_O,PV_FS_CHOWN<br>secflags=FSF_EPS |

Path 402 — /usr/sbin/mount — Rule 408
Path 404 — /usr/bin/chrole — Rule 410
Path 406 — /usr/bin/chown — Rule 412

FRAMEWORK FOR MANAGING ATTRIBUTES OF OBJECTS

BACKGROUND OF THE INVENTION

1. Field of the Invention

The present invention relates generally to data processing systems and in particular to a method, computer program product, and apparatus for managing objects. Still more particularly, the present invention provides a computer implemented method, apparatus, and computer program product for a framework for managing objects.

2. Description of the Related Art

An object in a computer is an item which can be accessed, such as, for example, a file, a device, or a command. In a computer, the computer's operating system keeps track of objects. The operating system may control each user's access to specific objects in the computer. For example, a format command in a kernel may be used to format a storage device, erasing all data stored on the storage device. To prevent the loss of important objects, the kernel may prevent specific users from accessing the important objects.

Typically, an operating system allows a system administrator to specify an access rule for an object. The access rule specifies the level of access each user has to the object. An access rule is specified using an attribute of the object known to the operating system. Thus, the kernel must know the object's attribute to control the level of access. If the object has an attribute and the kernel is not aware of the attribute, the attribute cannot be used to specify the access rule for the object.

SUMMARY OF THE INVENTION

The illustrative embodiments described herein provide a computer implemented method, computer program product, and apparatus for managing attributes for objects. A path-rule table containing a set of entries is stored in a location accessible by an operating system. The set of entries in the path-rule table specifies associations between objects and attributes of the objects. The path-rule table is associated with an identifier. When a request to access an object is received from an entity, the type of the object is identified. The identifier is used to identify the path-rule table for the type of object. Access to the object is then selectively provided based on an attribute associated with the object in the path-rule table.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
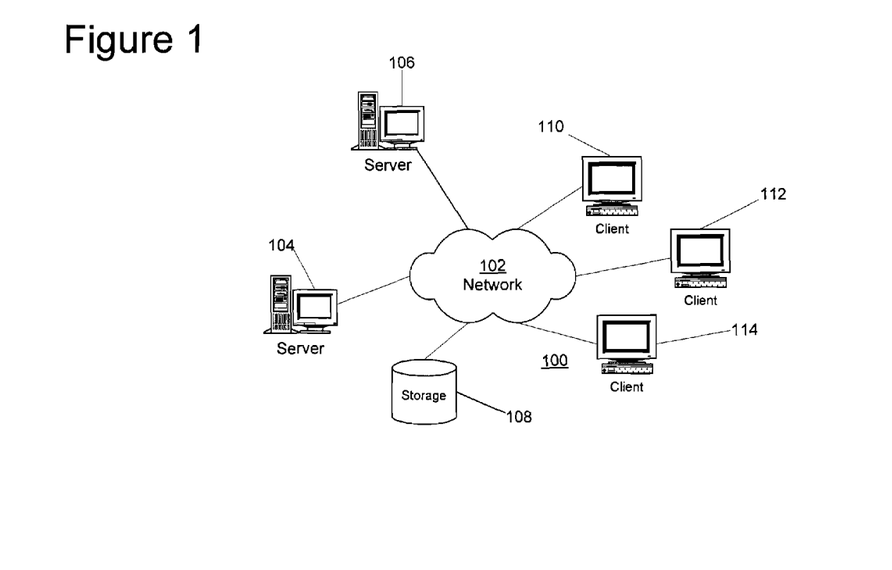
FIG. 1 depicts a pictorial representation of a network of data processing systems in accordance with an illustrative embodiment.
Figure 2:
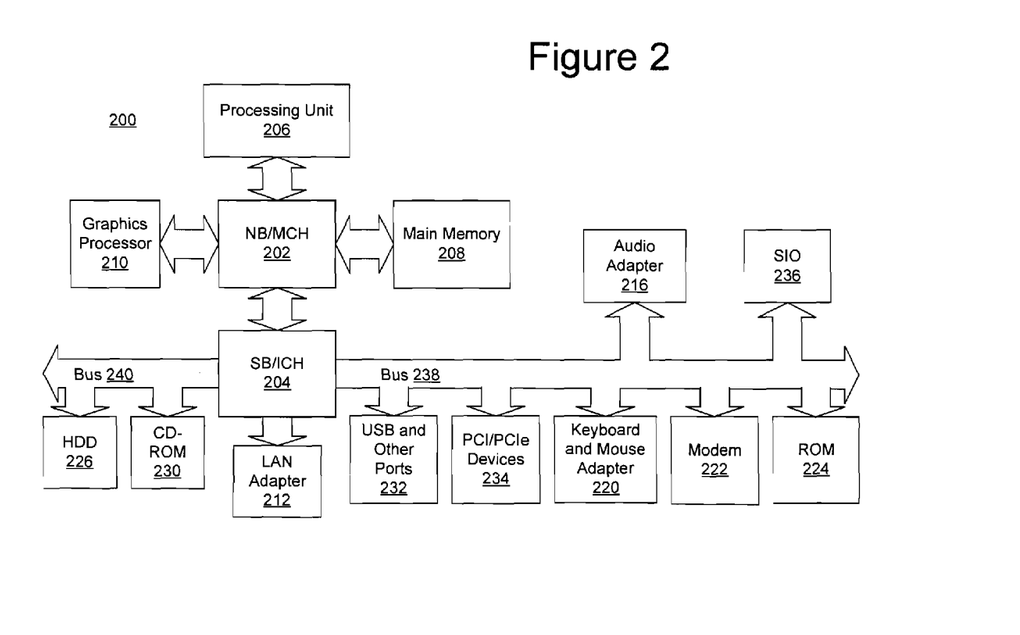
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Servers 104 and 106 provide processes for managing object attributes, such as file, device, or command attributes. These processes may manage local objects, or objects distributed across network 102. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

In a computer operating system, the lowest-level portion of the operating system is called a kernel. One part of the kernel is called the file system. The file system is used to locate objects in the computer. An object is any item referenced by a path, such as a file, a command, or a device.

An operating system on a computer may have one or more sub-systems. Each sub-system is a set of related software components for performing a specific purpose. For example, a computer may have a security sub-system which restricts access to important files, commands, and devices. A sub-system uses the kernel to access objects using the path of the object. The kernel associates a set of attributes with each object, such as, for example, the date and time the object was last modified.

A sub-system may associate one or more attributes with a set of objects, and the file system may not be aware of these attributes. The sub-system may have a need to manage the set of objects in the file system using at least one attribute of the set of objects which is not known to the file system. The illustrative embodiments recognize a need for managing a set of objects in the file system independent of the attributes known to the file system.

Figure 3:
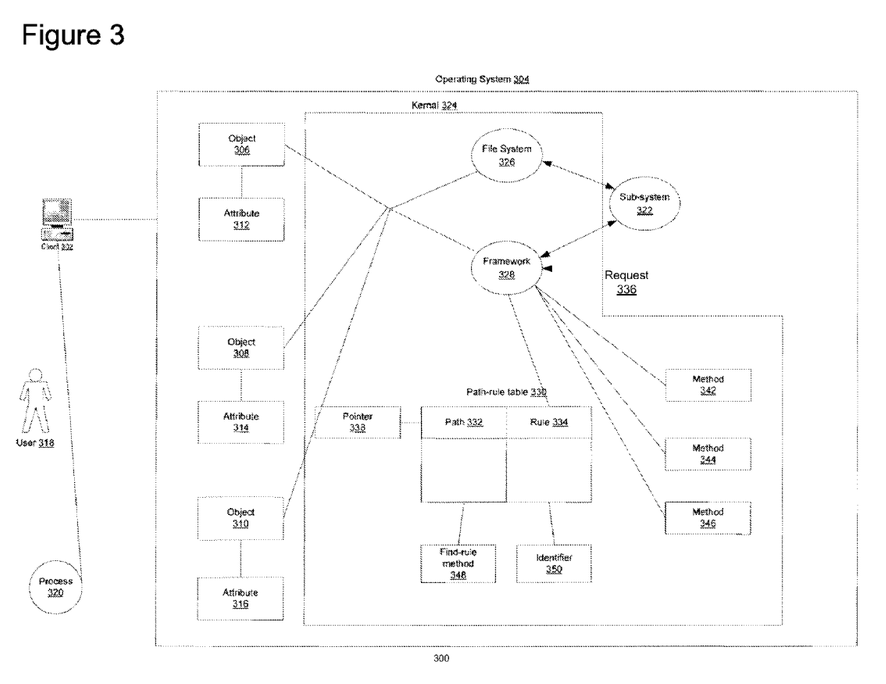
FIG. 3 is a block diagram of using a framework in accordance with an illustrative embodiment.

FIG. 3 is a block diagram of using a framework in accordance with an illustrative embodiment. In using a framework for managing objects 300, client 302 is a computer, such as client 110 in FIG. 1. An operating system, operating system 304, runs on client 302. Operating system 304 contains objects 306, 308, and 310. Operating system 304 may be a UNIX®-based operating system, such as, for example, Advanced Interactive executive (AIX®) from International Business Machines (IBM®). Objects 306-310 are each objects which may be in a computer, such as, for example, commands, files, and devices. Each object has an attribute. Object 306 has attribute 312, object 308 has attribute 314, and object 310 has attribute 316. User 318, and process 320 use operating system 304 to access objects 306-310 and perform various actions.

Operating system 304 contains various functional components, including sub-system 322, and kernel 324. Sub-system 322 is a component of operating system 304. For example, sub-system 322 may be used to implement an access control mechanism for objects 306-310 to control whether user 318, and process 320 can access objects 306-310. Kernel 324 has several components, including file system 326, and framework 328. User 318, process 320, and sub-system 322 may use file system 326 to access objects 306-310.

For example, assume sub-system 322 uses file system 326 to access objects 306-310. If file system 326 is aware of attributes 312-316 of objects 306-310, then sub-system 322 may manage objects 306-310 using attributes 312-316. For example, sub-system 322 may set attribute 312 to indicate that file system 326 should not allow user 318 to access object 306. However, if sub-system 322 wishes to associate attributes 312-316 with objects 306-310, and file system 326 is not aware of attributes 312-316, then sub-system 322 needs a means for managing the attributes 312-316 of objects 306-310. In this situation, kernel 324 provides framework 328 for managing attributes 312-316 of objects 306-310, independent of file system 326. Framework 328 may be used by more than one file system in operating system 304.

Framework 328 allows sub-system 322 to manage attributes 312-316 of objects 306-310, regardless of whether file system 326 is aware of attributes 312-316. Sub-system may use framework 328 to manage attributes 312-316 of objects 306-310 even when file system 326 is aware of attributes 312-316.

To use framework 328, sub-system 322 first asks framework 328 to create a path-rule table, in this example, path-rule table 330. Path-rule table 330 contains a set of entries, where a set is one or more entries. Each entry in path-rule table 330 contains at least two fields, path 332, and rule 334. Path 332 is an absolute path to an object. Rule 334 is meaningful to sub-system 322, and is used by sub-system 322 to decide whether to perform an action. For example, sub-system 322 may perform one or more actions such as setting a privilege level, setting an access level, and creating a checksum based on rule 334.

To create a path-rule table, sub-system 322 sends request 336 to framework 328, requesting framework 328 to create path-rule table 330. In this example, request 336 is a create request which asks framework 328 to create a path-rule table. In request 336, sub-system 322 specifies various information, such as the size and the contents of the path-rule table. For example, sub-system 322 may specify the number of entries to be created in the path-rule table, as well as a set of paths, and a set of rules in request 336. A set of paths is one or more paths, and a set of rules is one or more rules. Each entry in the path-rule table has one path, and one rule. When an object referenced by an absolute path in the path-rule table is accessed, the sub-system may use the rule associated with the absolute path to perform an action.

Framework 328 receives request 336 and creates path-rule table 330 using the information contained in request 336. For example, framework 328 creates a set of entries in path-rule table 330, and using the information contained in request 336, adds each path in the set of paths, and each rule in the set of rules, to each entry in path-rule table 330.

Sub-system 322 may optionally specify additional information in request 336. For example, sub-system 322 may specify pointer 338 in request 336. Pointer 338 is a pointer to a root directory. The root directory referenced by pointer 338 is used as a reference point for each absolute path in path-rule table 330. Sub-system 322 may also specify the maximum size of each absolute path in path 332 in the information in request 336.

Framework 328 also provides a set of one or more find-rule methods. In this example, framework 328 provides three find-rule methods, methods 342, 344, and 346. For a given path, the find-rule method finds the absolute path in the path-rule table which refers to the same object as the given path refers to. In request 336, sub-system 322 also specifies the find-rule method which the sub-system wishes to use with the path-rule table. For example, sub-system 322 may specify in request 336 that framework 328 use method 342 with the path-rule table.

Thus, when framework 328 receives request 336 from sub-system 322, framework 328 creates path-rule table 330, and stores the set of paths, and the set of rules in path-rule table 330. Each entry in path-rule table 330 contains one path, path 332, and one rule, rule 334. Framework 328 associates a find-rule method, find-rule method 348, with path-rule table 330. Find-rule method 348 identifies the specific method from path-rule table 330 chosen by sub-system 322 for use with path-rule table 330. Framework 328 then returns identifier 350 to sub-system 322.

Sub-system 322 may use identifier 350 to request framework 328 to perform a variety of operations. For example, sub-system 322 may use identifier 350 to request framework 328 to delete path-rule table 330, add one or more entries in path-rule table 330, and change find-rule method 348 to a different method.

Each find-rule method varies in the technique the find-rule method uses to match an object referenced by a given path with the object referenced by a path in path-rule table 330. For example, when using a path-rule table to manage a level of security for an object, different find-rule methods may be created based on the level of security, and the level of performance desired. Typically, when finding a set of rules for a given path in the path-rule table using a given find-rule method, the greater the level of security, the longer it takes to find the set of rules for the given path using the find-rule method. In this example, the find-rule method balances the need for fast performance with the need for greater security. One find-rule method may provide lower security with fast performance, while another find-rule method may provide may provide higher security with faster performance.

When user 318, or process 320 accesses an object, such as object 306, the object is accessed using a path. When the object is accessed using the path, sub-system 322 determines whether the object has an associated rule. Sub-system 322 sends a find request to framework 328, asking framework 328 to determine if object 306 has an associated rule in path-rule table 330. Sub-system 322 sends the path for the object accessed, and identifier 350 to framework 328. For clarity, the path given by sub-system 322 to framework 328 is called the given path.

Upon receiving the find request, framework 328 uses identifier 350 to find the path-rule table, and find-rule method associated with identifier 350. In this example, framework 328 uses identifier 350 to find path-rule table 330, and find-rule method 348. Framework 328 uses find-rule method 348 to determine if the object referenced by the given path is also referenced by a path in the path-rule table. If find-rule method 348 finds the path, such as path 332, in the path-rule table which refers to the object in the given path, find-rule method returns rule 334 associated with path 332 in the path-rule table.

Thus, rule 334 is returned to sub-system 322 in response to the find request of sub-system 322 to determine whether path of the object accessed has a rule in path-rule-table 330. Sub-system 322 may then perform an action using rule 334. For example, if sub-system 322 is a security sub-system, sub-system 322 may use rule 334 to determine whether user 318, and process 320 have the privileges necessary to access the object.

Figure 4:
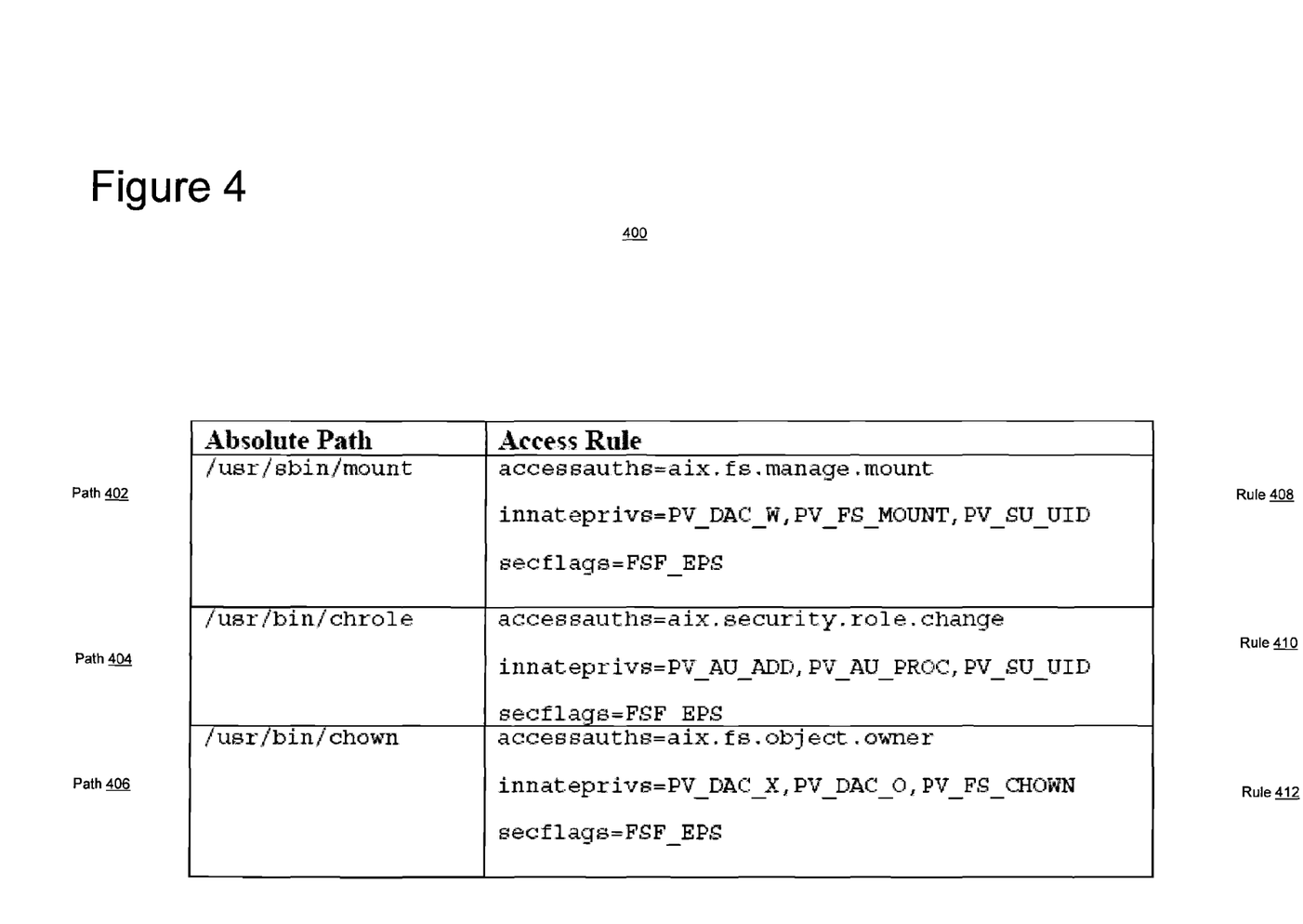
FIG. 4 is a block diagram of an exemplary path-rule table in accordance with an illustrative embodiment.

FIG. 4 is a block diagram of an exemplary path-rule table in accordance with an illustrative embodiment. Exemplary path-rule table 400 is an example of a path-rule table, such as path-rule table 330 in FIG. 3, in a Unix-based operating system, such as Advanced Interactive executive (AIX®). Exemplary path-rule table 400 contains three entries. Each entry has an absolute path, and an access rule. In this example, each path in paths 402, 404, and 406 is an absolute path for commands. In another embodiment, each path in the path-rule table may contain an absolute path for a device, and a file. Rule 408 is a rule for determining the access level for path 402. Similarly, rule 410 is a rule for determining the access level for path 404. Additionally, rule 412 is a rule for determining the access level for path 406.

Figure 5:
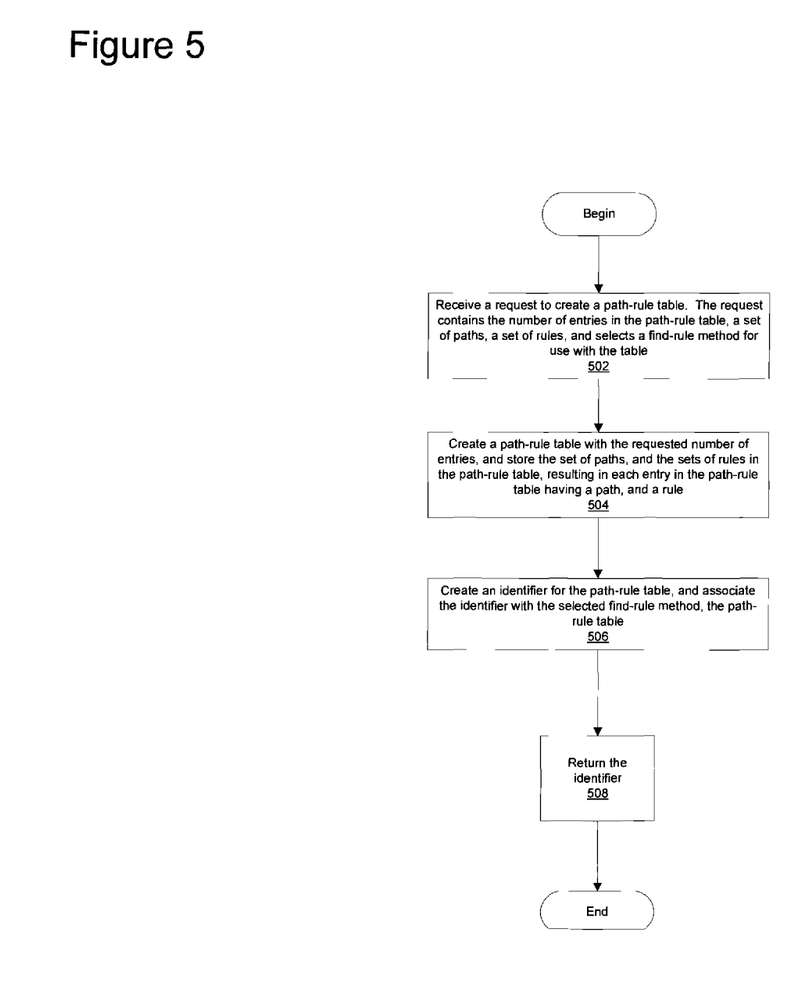
FIG. 5 is a flowchart for creating a path-rule table in accordance with an illustrative embodiment.

FIG. 5 is a flowchart for creating a path-rule table in accordance with an illustrative embodiment. The process in FIG. 5 is executed by a framework, such as framework 328 in FIG. 3. The process begins when a create request to create a path rule table is received (step 502). For example, the request to create the path-rule table may be sent by a sub-system, such as sub-system 322 in FIG. 3. The request contains the number of entries for the path-rule table, and a set of paths, and a set of rules. Optionally, the request may also contain a pointer to a root directory.

A path-rule table is created with the requested number of entries, and the set of paths, and the set of rules are stored in the path-rule table, resulting in each entry in the path-rule table having a path, and a rule (step 504). An identifier for the path-rule table is created, and the identifier is associated with the selected find-rule method, and the path-rule table (step 506). In step 506, optionally, the pointer to the root directory is stored with the path-rule table. The framework returns the identifier (step 508). Typically, a sub-system, such as sub-system 322 in FIG. 3 receives the identifier to the path-rule table created by the framework.

Figure 6:
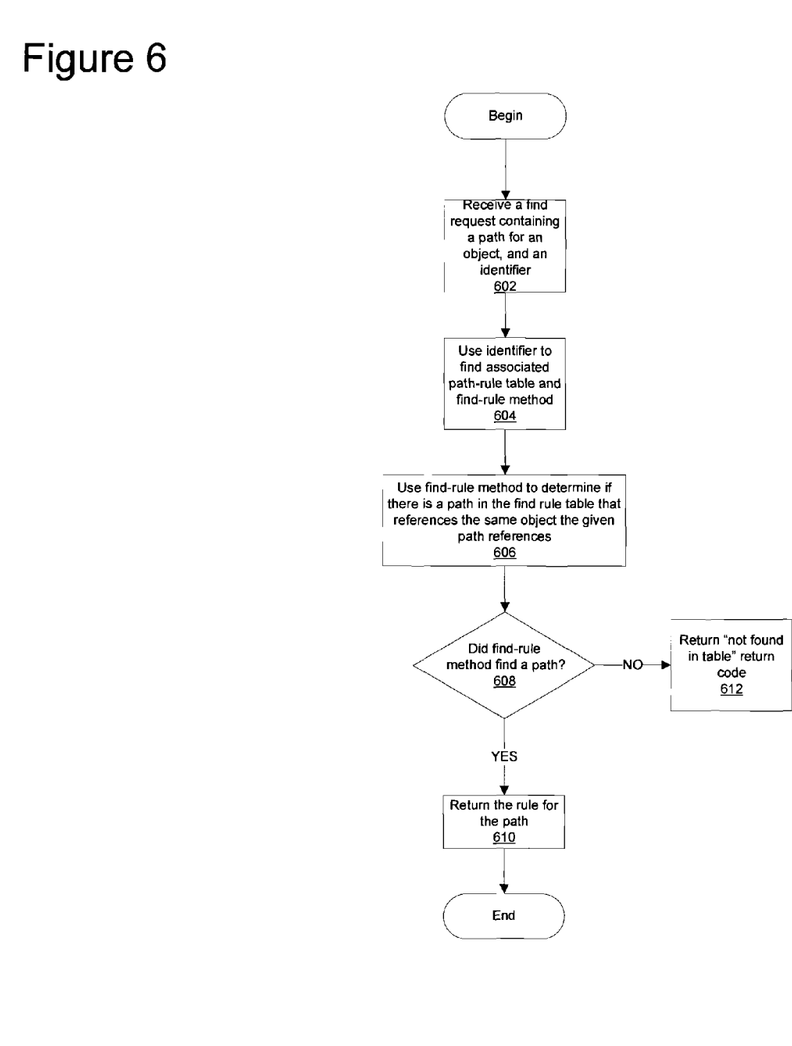
FIG. 6 is a flowchart of finding a rule in a path-rule table in accordance with an illustrative embodiment.

FIG. 6 is a flowchart of finding a rule in a path-rule table in accordance with an illustrative embodiment. The process in FIG. 6 is executed by a framework, such as framework 328 in FIG. 3. The process begins when a find request is received containing a path for an object, and an identifier (step 602). The identifier is an identifier for a path-rule table, such as identifier 350 in FIG. 3. The identifier is used to find the path-rule table, and the find-rule method associated with the identifier (step 604). The find-rule method is used to determine if there is a path in the find rule table that references the same object the given path references (step 606). A determination is made as to whether the find-rule method found a path in the path-rule table (step 608). If the answer in step 608 is "yes", because the find-rule method finds a path, then the rule corresponding to the path in the path-rule table is returned (step 610), and the process ends. If the answer is "no", and the find-rule method did not find a path, then a "not found in table" return code is returned (step 612), and the process ends.

Figure 7:
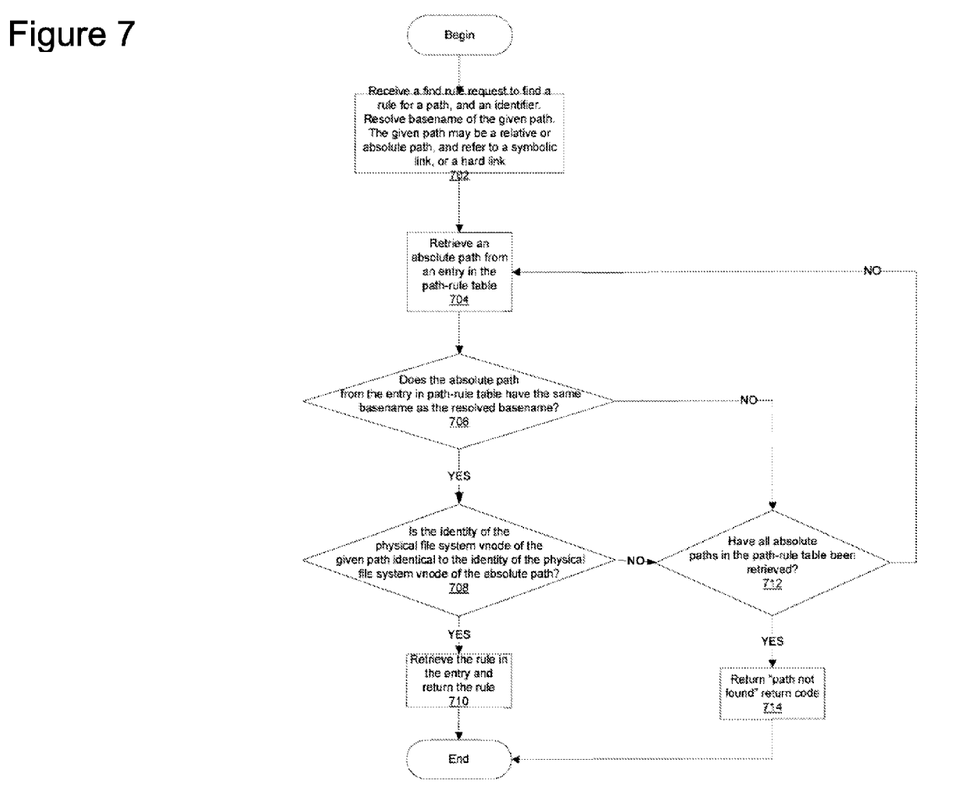
FIG. 7 is a flowchart of an exemplary find-rule method in accordance with an illustrative embodiment.

FIG. 7 is a flowchart of an exemplary find-rule method in accordance with an illustrative embodiment. The process in FIG. 7 is an example of a find-rule method. The flowchart in FIG. 7 is executed by a find-rule method in a framework, such as method 342 in FIG. 3. The process begins when a find request to find a rule for a path, a path, and an identifier are received (step 702). The given path may be a relative, or an absolute path. An absolute path is retrieved from an entry in the path-rule table (step 704). The path-rule table may be a path-rule table, such as path-rule table 330 in FIG. 3.

A determination is made whether the absolute path from the entry in path-rule table has the same basename as the resolved basename (step 706). The basename is the name of the object referenced by the path. For example, in path "/usr/doc/text", "text" is the basename of the path. If the answer in step 706 is "yes", because the absolute path from the entry in path-rule table has the same basename as the resolved basename, then a determination is made whether the identity of the physical file system vnode of the given path is identical to the identity of the physical file system vnode of the absolute path (step 708). In a Unix-based operating system, each active file, each current directory, each mounted-on file, text file, and the root has a unique vnode. Thus, a vnode uniquely identifies each object.

If the answer in step 708 is "yes", then the rule corresponding to the path in the path-rule table is retrieved, and returned (step 710). For example, framework 322 retrieves the rule corresponding to the given path in the path-rule table, and returns the rule to sub-system 322. If the answer in step 708 is "no", then a determination is made whether all absolute paths in the path-rule table have been retrieved. If the answer in step 712 is "yes", because all absolute paths have been retrieved from the path-rule table, then a "path not found" return code is returned (step 714), and the process ends. If the answer in step 712 is "no", because all absolute paths in the path-rule table have not been retrieved, then the process returns to step 704 and retrieves an absolute path from an entry in the path-rule table.

Thus, the illustrative embodiments described herein provide a computer implemented method, apparatus, and computer program product for accessing an object in a set of objects. Responsive to receiving a path-rule table containing a set of entries, a table identifier is created, wherein the table identifier is used to identify the path-rule table. A rule finder is received, wherein the rule finder is used to identify the rule in the path-rule table for accessing the object.

The flowchart and block diagrams in the figures illustrate the architecture, functionality, and operation of some possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing attributes for objects, the computer implemented method comprising:
    storing a path-rule table containing a set of entries in a location accessible by an operating system, wherein the set of entries in the path-rule table specifies associations between objects and attributes of the objects, wherein each entry in the path-rule table includes a path for an object and an associated attribute, wherein the path identifies a location of the object;
    associating the path-rule table with an identifier;
    responsive to a request from an entity to access the object, identifying a type of the object;
    using the identifier to identify the path-rule table for the type of object; and
    selectively providing a level of access to the object based on the attribute associated with the object in the path-rule table and based upon the entity, wherein the entity is one of a process, a user, or a combination of a process and a user.

2. The computer implemented method of claim 1, wherein storing a path-rule table further comprises:
    creating the identifier for the path-rule table; and
    receiving a rule finder, wherein the rule finder is used to identify the attribute in the path-rule table for accessing the object.

3. The computer implemented method of claim 1, wherein the level of access specifies an authorization or a privilege.

4. The computer implemented method of claim 1, wherein a type of object is one of a command, a device, or a file.

5. The computer implemented method of claim 1, wherein a path-rule table is stored for each type of object.

6. The computer implemented method of claim 1, wherein the path-rule table is provided by the operating system to a kernel.

7. A data processing system for managing attributes for objects, the data processing system comprising:
    a bus;
    a storage device connected to the bus, wherein the storage device contains computer usable code;
    at least one managed device connected to the bus;
    a communications unit connected to the bus; and
    a processing unit connected to the bus, wherein the processing unit executes the computer usable code to store a path-rule table containing a set of entries in a location accessible by an operating system, wherein the set of entries in the path-rule table specifies associations between objects and attributes of the objects, wherein each entry in the path-rule table includes a path for an object and an associated attribute, wherein the path identifies a location of the object; associate the path-rule table with an identifier; identify, in response to a request from an entity to access the object, a type of the object; use the identifier to identify the path-rule table for the type of object; and selectively provide a level of access to the object based on the attribute associated with the object in the path-rule table and based upon the entity, wherein the entity is one of a process, a user, or a combination of a process and a user.

8. The data processing system of claim 7, wherein the computer usable code to store a path-rule table further comprises computer usable code to create the identifier for the path-rule table and receive a rule finder, wherein the rule finder is used to identify the attribute in the path-rule table for accessing the object.

9. A computer program product for managing attributes for objects, the computer program product comprising:
    a non-transitory computer usable medium having computer usable program code tangibly embodied thereon, the computer usable program code comprising:
    computer usable program code for storing a path-rule table containing a set of entries in a location accessible by an operating system, wherein the set of entries in the path-rule table specifies associations between objects and attributes of the objects, wherein each entry in the path-rule table includes a path for an object and an associated attribute, wherein the path identifies a location of the object;
    computer usable program code for associating the path-rule table with an identifier; and
    computer usable program code for identifying, in response to a request from an entity to access the object, a type of the object;
    computer usable program code for using the identifier to identify the path-rule table for the type of object; and
    computer usable program code for selectively providing a level of access to the object based on the attribute associated with the object in the path-rule table and based upon the entity, wherein the entity is one of a process, a user, or a combination of a process and a user.

10. The computer program product of claim 9, wherein the computer usable program code for storing a path-rule table further comprises:
    computer usable program code for creating the identifier for the path-rule table; and
    computer usable program code for receiving a rule finder, wherein the rule finder is used to identify the attribute in the path-rule table for accessing the object.

11. The computer program product of claim 9, wherein the level of access specifies an authorization or a privilege.

12. The computer program product of claim 9, wherein a type of object is one of a command, a device, or a file.

13. The computer implemented method of claim 9, wherein a path-rule table is stored for each type of object.

14. The computer program product of claim 9, wherein the path-rule table is provided by the operating system to a kernel.

* * * * *